United States Patent [19]

Forschirm

[11] Patent Number: 4,732,575
[45] Date of Patent: Mar. 22, 1988

[54] TRIOXANE FUELS WITH INCREASED HEAT CONTENT

[75] Inventor: Alex Forschirm, Parsippany, N.J.

[73] Assignee: Celanese Corporation, New York, N.Y.

[21] Appl. No.: 836,889

[22] Filed: Mar. 6, 1986

[51] Int. Cl.$^4$ ................................................ C10L 7/00
[52] U.S. Cl. .......................................... 44/7.6; 44/7.7
[58] Field of Search ................... 44/6, 7.3, 7.5, 7.6, 44/7.7, 41, 60

[56] References Cited

U.S. PATENT DOCUMENTS

| | | | |
|---|---|---|---|
| 3,934,986 | 1/1976 | Avedikian | 44/6 |
| 4,286,968 | 9/1981 | Casinelli | 44/25 X |
| 4,302,208 | 11/1981 | Wood et al. | 44/7.5 X |
| 4,326,854 | 4/1982 | Tanner | 44/10 B |
| 4,443,227 | 4/1984 | Avedikian | 44/41 X |
| 4,582,869 | 4/1986 | Waggoner | 524/542 X |
| 4,595,396 | 6/1986 | Erdman | 44/51 X |

Primary Examiner—Peter A. Nelson
Attorney, Agent, or Firm—Depaoli & O'Brien

[57] ABSTRACT

The heat content of trioxane fuel is increased by the addition of dialkyl ethers of alkanediols such as 1,2-dimethoxyethane or 1,1-diethoxyethane.

10 Claims, 3 Drawing Figures

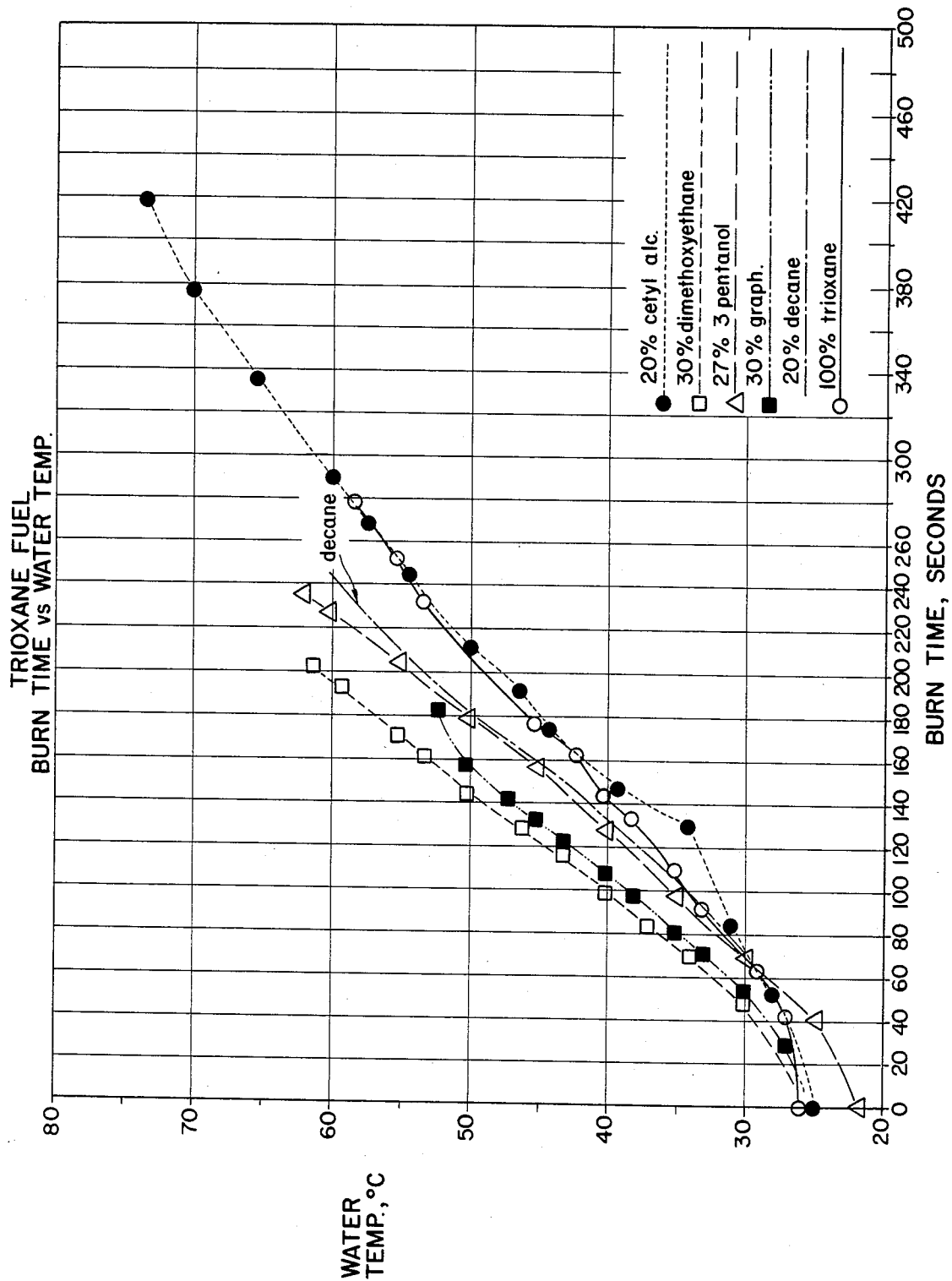

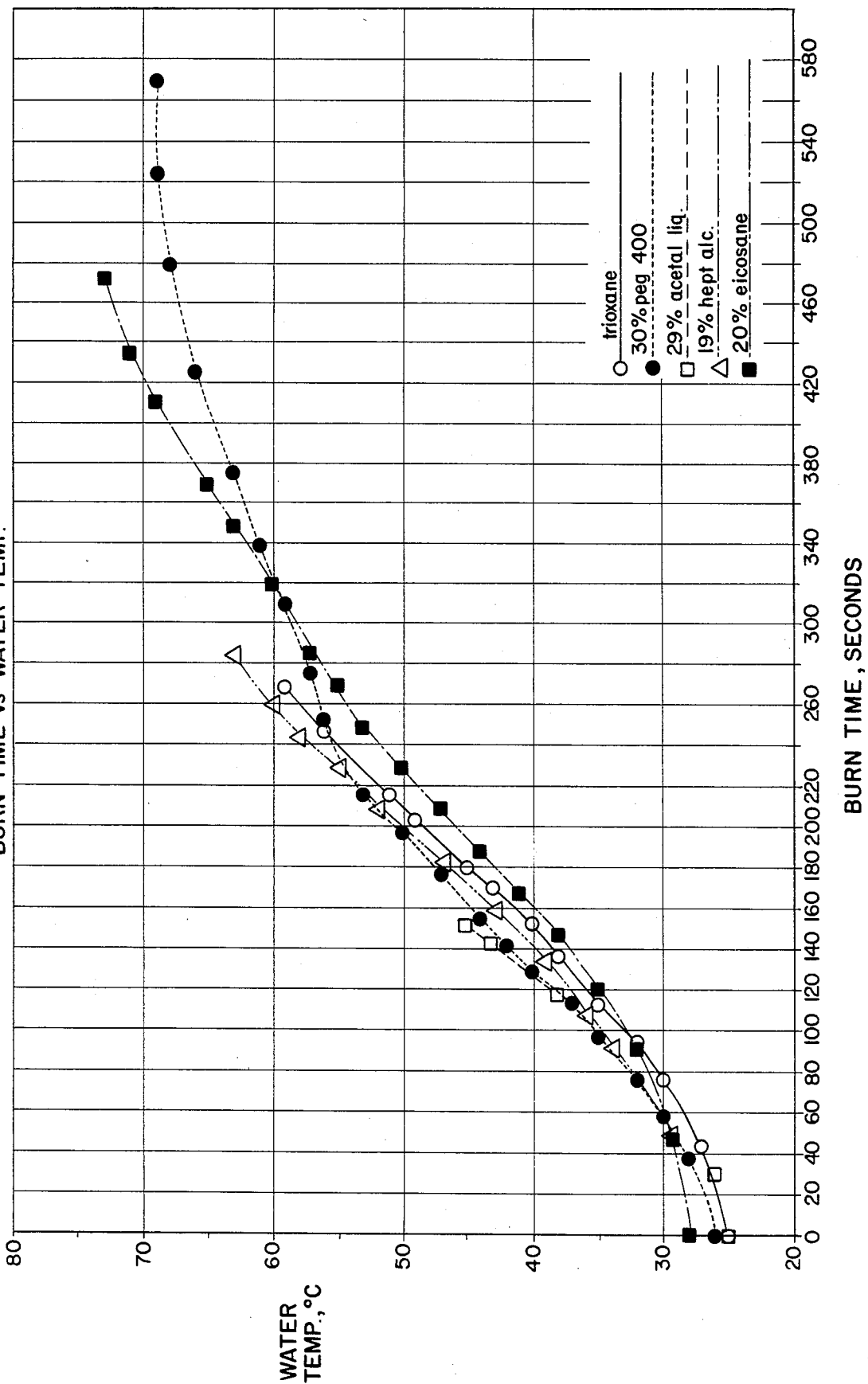

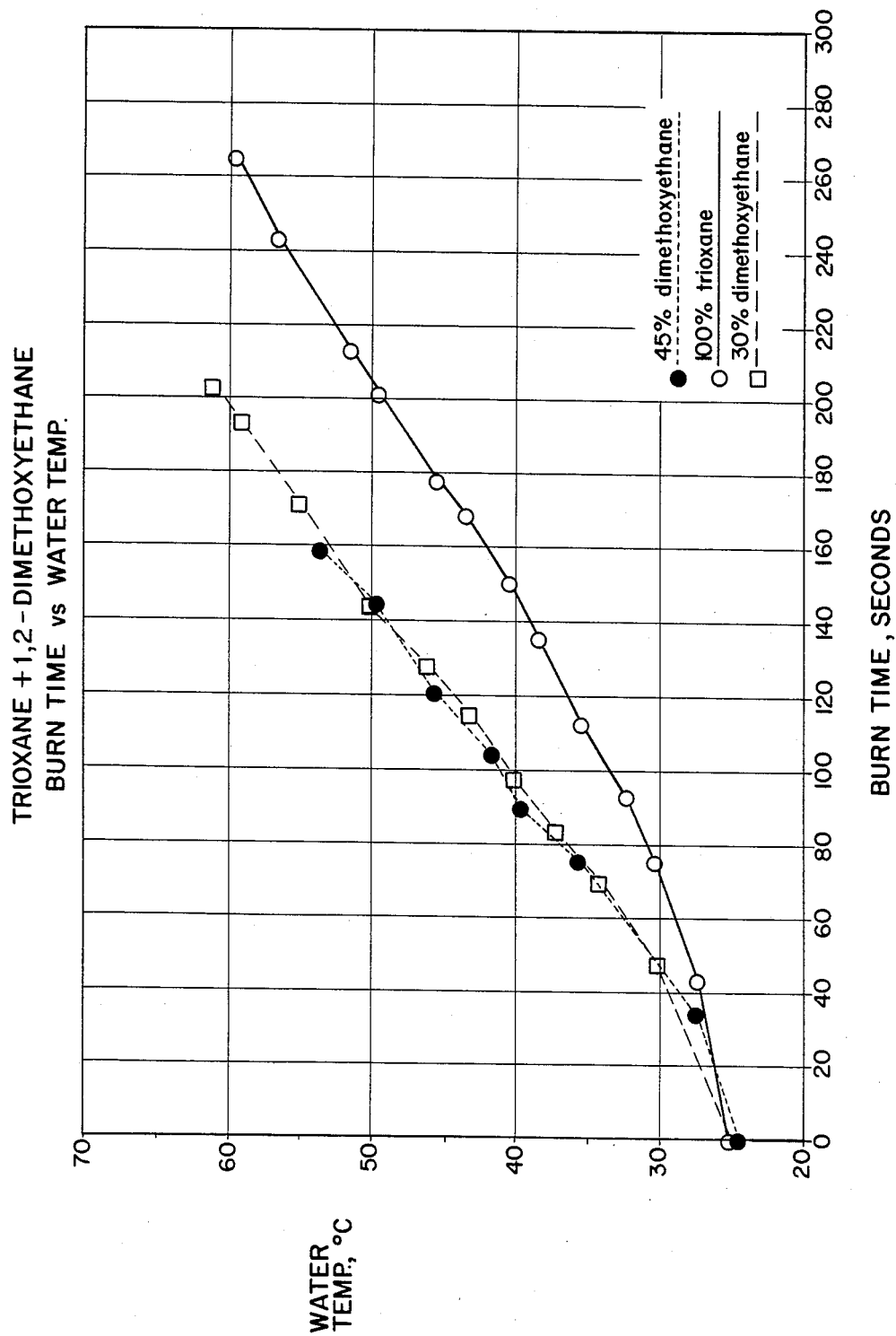

TRIOXANE FUELS WITH INCREASED HEAT CONTENT

RIGHTS OF THE GOVERNMENT

This invention was made with Government support under Contract No. DAAK60-85-C-0031 awarded by the Department of Defense (DOD). The government has certain rights in this invention.

BACKGROUND OF THE INVENTION

This invention relates to novel solid heating fuels and, in particular, the invention is concerned with trioxane fuels of improved heat content.

Solid or gelled heating fuels have wide potential application as convenient, easily handled and comparatively safe heat sources. Such solid heating fuels in portable form can be employed in civilian uses such as camping, outdoor cooking of all sorts, fire-starting, emergency supplies, and the like. Solid heating fuels are also essential for military use, including the heating of field rations, etc.

A widely accepted form of solid heating fuel is trioxane formed from compaction of powdered trioxane with or without compaction aids such as magnesium stearate, a pure trioxane melt, or a trioxane melt mixed with an organic binder. Trioxane is a cyclic trimer of formaldehyde, molecular weight of 90 and has a melting point of 61°–62° C. Compacted or melted, molded or otherwise shaped and then cooled to a solid form, trioxane fuel such as in the shape of pellets is advantageous in view of the lack of toxicity and ease of ignition of this fuel. The low luminosity of trioxane fuel is especially useful for military applications.

One disadvantage of pure trioxane fuel is its low heat value, on the order of 7,200 Btu/lb. This low heat value is especially disadvantageous when trioxane is used as a heat source for heating field rations for military use. In a recent development, canned rations are being phased out in favor of meals ready-to-eat (MRE) in which a flexible package containing the meal is heated in a canteen of water to palatable temperature, i.e., 160° F. (70° C.). Because the heat is not applied directly to the food, MRE require a longer period of time to heat than canned rations. Accordingly, to meet the increased temperature requirement for MRE it is necessary to find a higher caloric content fuel than pure trioxane fuel. In view of the advantages of trioxane fuel such as previously discussed, in particular, the low luminosity, it would be beneficial to increase the caloric content of trioxane-based fuel if such enhanced heat content could be achieved without sacrificing the known advantages.

U.S. Pat. No. 3,355,269 is concerned with improving the caloric content of gelled fuel such as obtained from oxygenated hydrocarbons including ethyl acetayte; 1,4-dioxane; 1,3-dioxolane; diethyl carbonate; diethyl ether of ethylene glycol; dimethyl ether of diethylene glycol; trioxane, propyl acetate; butyl acetate; amyl acetate; hexyl acetate; methyl propionate; methyl butyrate; ethyl formate; diethyl ether of diethylene glycol; diethyl formal; dimethyl acetal; etc. This patent discloses mixing the oxygenated hydrocarbon fuel with a high molecular weight polymer prepared by reacting in the fuel, a semipolymer which is soluble in the liquid fuel and which comprises polyalkylenes or polyalkylidenes and polyethers, and a chain-extending agent which is a polyfunctional molecule containing two reactive groups such as aromatic polyisocyanate.

It is a primary object of the present invention to increase the heating value of trioxane fuels. A further object of the invention is to increase the heating value of trioxane fuels without sacrificing the advantages of pure trioxane fuel such as lack of toxicity and ease of ignition. Still a further object of this invention is to enhance the heat content of trioxane fuel for military application without sacrificing the low luminosity of pure trioxane fuel.

These and other objects, aspects, and advantages of the invention will be readily apparent to those of ordinary skill in the art on consideration of the following description of the invention.

SUMMARY OF THE INVENTION

In accordance with the present invention, the heating value of pure trioxane fuel is increased by the addition thereto of dialkyl ethers of alkanediols wherein each alkyl ether group contains 1 to 6 carbon atoms and the alkanediol contains 2 to 12 carbon atoms.

For use in military applications such as for heating field rations it is important that the advantages of pure trioxane fuel such as easy ignition and low luminosity are not sacrificed by the incorporation of higher heat content additives. Thus, in accordance with the invention, trioxane fuel pellets are provided with an enhanced heat content over pure trioxane by addition thereto of dialkyl ethers of alkanediols wherein each alkyl ether group contains 1 to 6 carbon atoms and the alkanediol contains 2 to 12 carbon atoms and wherein such dialkyl ethers do not substantially alter the non-luminous flame which is characteristic of pure trioxane. It has been found that even though individual heat enhancement additives within the above-defined class may burn with yellow flames, e.g., 1,2-dimethoxyethane and 1,1-diethoxyethane, when added to the trioxane fuel base, such additives do not compromise the low luminosity of trioxane fuel.

BRIEF DESCRIPTION OF THE FIGURES

FIG. 1 is a plot of Burn Time vs. Water Temperature of various trioxane-based fuels including 1,2-dimethoxyethane.

FIG. 2 is a plot of Burn Time vs. Water Temperature of various trioxane-based fuels including 1,1-diethoxyethane (acetal liquid).

FIG. 3 is a plot of Burn Time vs. Water Temperature of trioxane fuels containing varying amounts of 1,2-dimethoxyethane.

DETAILED DESCRIPTION OF THE INVENTION

The trioxane base fuel is a cyclic trimer of formaldehyde. Many methods are known for forming trioxane from formaldehyde and separating the product from the formaldehyde reactant. The particular method of forming trioxane and method of separation to obtain pure trioxane product is well known to those of ordinary skill in the art and, thus, do not form important features of the present invention. The only importance that exists is with regard to the source of trioxane. For ease of shaping the melted trioxane into the desired form, the liquid should be clear and the tendency to gel or lump should be minimized. Compaction of powdered trioxane into the desired form is also useful. Known compaction aids may be utilized.

Similarly, the particular shape of the solidified trioxane fuel is not critical. Thus, solidified trioxane fuel in the shape of bars, logs, pellets, candles, etc. are useful in the present invention. For example, as a portable heat source for cooking meals, a typical trioxane fuel source shaped into 10–30 gram pellets has been found useful. A single use heat source of about 15 grams is typical.

The additive for enhancing the heat content of pure trioxane fuel is selected from among the dialkyl ethers of alkanediols wherein each of the alkyl ether groups contains 1 to 6 carbon atoms and the alkanediol contains 2 to 12 carbon atoms. Among the preferred compounds are the dimethyl and diethyl ethers of ethanediol. Possibly since such compounds are similar to trioxane in terms of structure and molecular weight, when mixed with trioxane they burn with the non-luminous blue flame of pure trioxane, although when the additives are burned in pure form they produce a yellow flame. Particularly preferred additives are 1,2-dimethoxyethane and 1,1-diethoxyethane (acetal).

The amount of additive to be incorporated into the trioxane fuel base will depend upon the desired increase in heat content of the fuel over pure trioxane, as well as any limitations which may be found in blending the additive with trioxane and/or forming the blended mixture into the desired form. In accordance with this invention, it is especially desired to increase the heat value of pure trioxane fuel by at least about one-third.

In Table I, are the heats of combustion of trioxane and various compounds which have heat of combustion values substantially higher than pure trioxane. Knowing the heats of combustion and molecular weight, weight ratios of trioxane to additive can be determined in order to increase the heat content of trioxane by one-third. Table II illustrates the manner in which to determine the amount of additives which will yield one-third increase in the heat content of trioxane-based fuel. Of course, such amounts are only estimations and do not further take into account other characteristics of the fuel additives which would render a particular fuel additive unsuitable in the present invention. For example, 1,2-dimethoxyethane has been found to increase the heat content of trioxane fuel about one-third when added in amounts of 45 wt.% (as indicated from Table 2). Yet even at 30 wt.%., 1,2-dimethoxyethane has been found to increase the heat content of trioxane to equivalent amounts obtained by the larger 45 wt.% addition as is demonstrated below. Within the class of heat enhancement additives useful in the present invention, amounts of additives will typically range from 15–50 wt.% additive relative to the fuel mixture.

TABLE I

| HEAT OF COMBUSTION | | |
|---|---|---|
| | BTU/LBS | KCAL/MOLE |
| Trioxane | 7,200 | 360 |
| graphite | 14,087 | 94 |
| n - decane | 20,389 | 1,620 |
| n - eicosane | 20,295 | 3,180 |
| 3 - pentanol | 16,187 | 792 |
| n - heptyl alcohol | 17,128 | 1,109 |
| hexamethylenetetramine (hexamine) | 12,877 | 1,004 |
| cyclohexane | 20,079 | 937 |
| acetal (1,1-diethoxyethane) | (est.: 12,000–13,000) | (est. 820) |
| polyethylene glycol (PEG) 400 | (est.: 10,000–11,000) | — |
| 1,2-dimethoxyethane | 12,560 | 628 |

TABLE II

| Trioxane/Additive Fuel Compositions | |
|---|---|
| % of Additive in Fuel Tablet Composition: | Heat of Combustion of Additive Kcal/mol Molecular Weight of Additive |
| 15 | 12.9 |
| 20 | 10.7 |
| 25 | 9.3 |
| 30 | 8.4 |
| 40 | 7.3 |
| 50 | 6.7 |

Example:
n-decane:
Mol. wt. = 142
Heat of combustion = 1620 kcal/mol
Ratio = 11.4 Thus about 18% n-decane and 82% trioxane is required to increase fuel value by one-third.

The following examples offer a comparison of heat enhancement characteristics and flame properties for various additives mixed with the trioxane fuel base. The invention should not be construed as being limited by the specific examples which yield the preferred increase in heat content and desired low luminosity.

EXAMPLE 1

A container of trioxane was heated for several hours in an oven to melt the trioxane, and the clear blue (dyed) liquid was then poured in about 400 ml. portions into 500 ml. Ehrlenmeyer flasks, which were stoppered and stored, and served as the starting material. The flasks were heated in a water bath of about 70°–80° C. and aliquots poured out for use in the blending experiments. Disposable aluminum dishes were used for the burning experiments. The blend was weighed directly into the dish, mixed, allowed to cool, and ignited.

The appearance of flames from various fuel mixtures produced and burned in accordance with the above-described procedure is given in Table III.

TABLE III

| APPEARANCE OF FLAMES OF TRIOXANE/ADDITIVE FUEL MIXTURES | | | |
|---|---|---|---|
| Additive | Molecular Weight g/mole | % | Appearance |
| none | | 0 | Blue - Virtually non-luminous, no smoke |
| polyethylene glycol 400 | | 30 | Clear blue changing to bright yellow |
| 1,1-diethoxyethane (acetal) | 118 | 29 | Clear blue |
| eicosane | 283 | 20 | Blue with yellow flecks changing to bright yellow and sooty |
| n-heptyl alcohol | 116 | 20 | Blue changing to yellow |
| graphite | 12 | | Blue with yellow flashes |
| 1,2-dimethoxyethane | 90 | 30 | Clear blue |
| 1,2-dimethoxyethane | 90 | 45 | Clear blue |
| n-decane | 142 | 20 | Very yellow & sooty changing to blue |
| 100% hexamine | 140 | — | Very yellow |
| 3-pentanol | 88 | 27 | Very yellow to blue |
| cyclohexane (+4% Mg stearate) | 98 | 30 | Very sooty yellow to blue |

In addition, small quantities of several chemicals on a spatula were held in the pure trioxane flame and observed. The observations are set forth below:

naphthalene—dense black smoke
furnace black—yellow flashes
glyceryl monostearate—yellow
polyethylene—yellow
benzoid acid—yellow
Cymel 405 (melamine—formaldehyde)—non-flamm.
polyethylene glycol 6000 disterate—no ignition Of the compounds tested, it can be seen that 1,1-diethoxyethane and 1,2-dimethoxyethane were the only additives which maintained the clear blue non-luminous flame characteristic of pure trioxane.

EXAMPLE 2

A standard Army canteen and stand, containing 400 ml. of unstirred water was used as a calorimeter. An aluminum dish containing the fuel mixtures was placed 70 mm. under the canteen and ignited. Burn times and water temperatures were measured and plotted as shown in FIGS. 1, 2 and 3.

As can be seen from FIG. 1, the fuel mixture containing trioxane and 30% 1,2-dimethoxyethane resulted in the highest water temperature relative to the additives tested as well as pure trioxane. Similar results are obtained for 1,1-diethoxyethane added in an amount of 29 wt.%, see FIG. 2. As shown in FIG. 3, 30% and 45% by weight 1,2-dimethoxyethane yielded substantially the same results.

What is claimed is:

1. A trioxane-based solid fuel having improved heat content comprising a mixture of a solid fuel consisting essentially of trioxane and an additive to enhance the heat content of said trioxane selected from the dialkyl ethers of alkanediols wherein each of said alkyl ether groups contains 1 to 6 carbon atoms and the alkanediol contains 2 to 12 carbon atoms.

2. The trioxane fuel of claim 1 wherein said alkanediol comprises ethanediol.

3. The trioxane fuel of claim 1 wherein said additive comprises 1,2-dimethoxyethane.

4. The trioxane fuel of claim 1 wherein said additive comprises 1,1-diethoxyethane.

5. The trioxane fuel of claim 3 wherein said additive is present in amounts of 20 to 50% by weight based on said fuel.

6. The trioxane fuel of claim 4 wherein said additive is present in amounts of about 20 to 50% by weight based on said fuel.

7. The trioxane fuel of claim 1 wherein said additive provides a substantially non-luminous flame.

8. The trioxane fuel of claim 3 wherein said dimethoxyethane is present in amounts of 30% by weight relative to said fuel.

9. The trioxane fuel of claim 1 shaped into the form of 10–30 gram pellets.

10. The trioxane fuel of claim 9 wherein said pellets contain about 15 grams of said fuel.

* * * * *